United States Patent [19]
Anderson

[11] 3,893,231
[45] July 8, 1975

[54] TECHNIQUE FOR FABRICATING VACUUM WAVEGUIDE IN THE X-RAY REGION

[75] Inventor: John P. Anderson, Peekskill, N.Y.

[73] Assignee: The United States of America as represented by the Secretary of the Navy, Washington, D.C.

[22] Filed: Dec. 19, 1974

[21] Appl. No.: 534,331

[52] U.S. Cl. .................. 29/600; 156/18; 204/14 R; 204/32 R; 333/95 R
[51] Int. Cl.² ........................................ H01P 11/00
[58] Field of Search ....... 29/600, 601, 527.1, 527.2; 204/14 R, 14 N, 30, 29, 32 R; 156/2, 7, 18, 47, 51, 53; 333/95 R, 98 R, 99 R

[56] References Cited
UNITED STATES PATENTS
3,613,230   10/1971   Griff .................................. 29/600
3,799,777   3/1974   O'Keefe et al. ....................... 156/2

Primary Examiner—C. W. Lanham
Assistant Examiner—James R. Duzan
Attorney, Agent, or Firm—R. S. Sciascia; P. Schneider; W. Sheehan

[57] ABSTRACT

A method of fabricating vacuum waveguides in the x-ray region comprises the following steps:

a. selecting an optically flat substrate b. depositing a film of metal on the substrate c. photoetching a line corresponding to the width of the waveguide in the metal film d. selecting a parylene pellicle e. depositing a metal film on one side of the pellicle f. depositing a film perpendicular to the length of the waveguide on the opposite side of the pellicle g. placing the pellicle in fixture which applies slight pressure to the pellicle (stretching the pellicle over the substrate)

h. evacuating the fixture.

3 Claims, 3 Drawing Figures

TECHNIQUE FOR FABRICATING VACUUM WAVEGUIDE IN THE X-RAY REGION

BACKGROUND OF THE INVENTION

The invention relates generally to a method for fabricating waveguides and, more particularly, to a method for fabricating vacuum waveguides for soft x-rays (x-rays above 7A).

Since x-rays are highly absorptive in air, it is desirable to provide guides for such x-rays that are capable of being self-sustaining in an evacuated chamber. The x-rays traversing such evacuated waveguides are negligibly absorbed. Discussion of such x-ray waveguides can be found in articles tilted "Propogation of X-Rays in Waveguides" by Spiller & Segmuller; "Parylene Thin Films for Radiation Applications" by Spivak (Union Carbide); and "Parylene Pellicles," a Union Carbide publication. The present invention is a method of fabricating these waveguides.

SUMMARY OF THE INVENTION

The present method of constructing the waveguide consists of a number of individual steps.

1. Select an optionally flat substrate, preferably one that reflects in the x-ray region.
2. Deposit a film of metal to the desired thickness corresponding to the design parameters of the wavelength to be propogated.
3. Photoetch a line corresponding to the width of the waveguide.
4. Select a parylene N ($C_8 H_8$) pellicle somewhat larger than the total substrate (1,000 A to 3,000 A).
5. Vacuum deposit a metal film on the inside or vacuum side of the pellicle. This film should be larger in width than the waveguide channel so it will form the 4th wall of the waveguide; while the length of this film is arbitrary and depends on the desired length of the waveguide.
6. On the opposite side of the pellicle, a film perpendicular to the length of the waveguide is deposited to facilitate an isolation bar to suppress leakage and crosstalk.
7. The substrate is then placed in a fixture which applies slight pressure to the pellicle forming the waveguide and a vacuum tight seal. The pellicle is actually stretched over the substrate allowing x-ray entry into the waveguide through the parylene.
8. The interior of the fixture is then pumped out to form the vacuum space in the waveguide.

OBJECTS OF THE INVENTION

An object of the invention is to provide an improved vacuum waveguide capable of long line transmission and mode discrimination.

Another object of the invention is to fabricate a low cost waveguide having variable parameters.

Other objects, advantages and novel features of the present invention will become apparent from the following detailed description of the invention when considered in conjunction with the accompanying drawing.

DETAILED DESCRIPTION OF THE INVENTION

Figure 1:
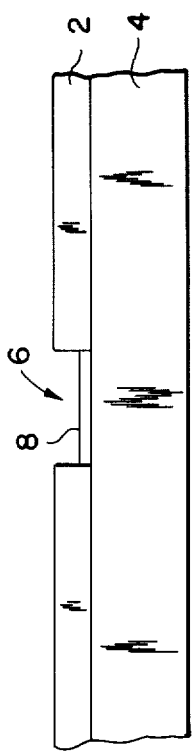
FIG. 1 is an end view of the waveguide in its initial steps of fabrication.

Throughout the drawings, like numerals indicate the same parts. In FIG. 1, the waveguides construction is initiated by depositing a film of metal 2, for example gold, on a substrate 4, which may silicon. A channel 6 is photoetched in the metal film 2 to a width corresponding to the desired width of the waveguide.

Figure 2:
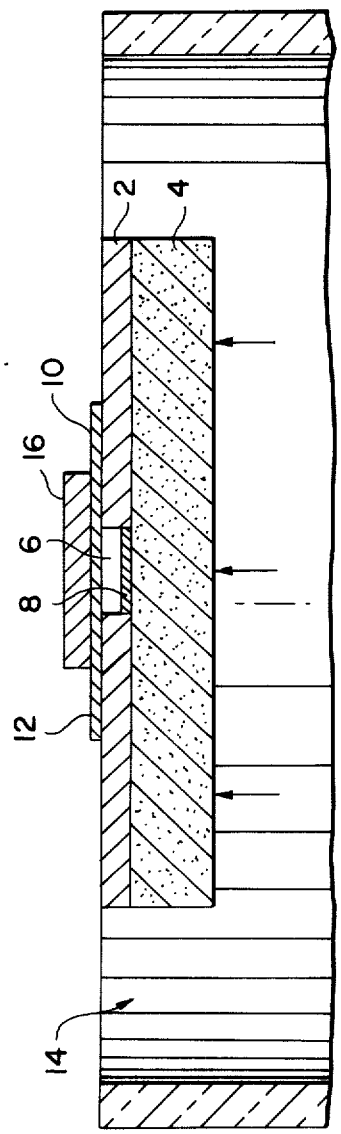
FIG. 2 is a cross-sectional end view of the completed waveguide.

A thin layer of gold 8 (FIG. 2) is deposited within the channel 6. Two walls and the floor of the channel 6 are thus formed of gold. In order to form a closed channel 6 which is entirely gold, a very thin film 10 of a material sold as Parylene N (chemical composition $C_8 H_8$ and manufactured by Union Carbide Corp.) is supported on a substrate, not shown, and a second thin layer 12 of gold is deposited onto the PARYLENE N. The PARYLENE N is stripped from its substrate and the gold film 12 thereon is placed over the length of the channel 6 so that when the waveguide is placed in an evacuated chamber 14, the gold film 12 is drawn toward the gold layer 2. An x-ray impermeable block 16 is located over the channel 16. The block 16 may be formed of materials such as lead, copper or gold. The block 16 could instead be an x-ray impervious coating on the opposite side of the Parylene N.

Figure 3:
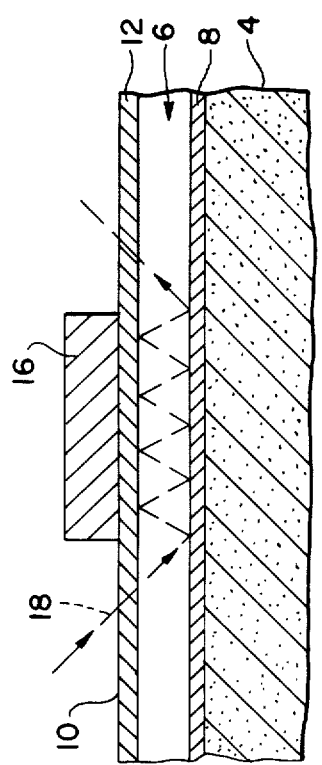
FIG. 3 is a cross-sectional view of the completed waveguide.

As seen in FIG. 3, an x-ray beam 18, entering the waveguide channel 6 disposed in a vacuum at the appropriate angle, is reflected by the walls of the channel along the length of the channel. The block 16 prevents the transmission of the x-ray beam through the upper wall of the channel as the beam traverses the channel 6. Such waveguide is particularly advantageous for its ease, as well as low cost, of manufacture.

Thus, an improved method of fabricating vacuum waveguides is the x-ray region has been described.

Obviously, many modifications and variations of the present invention are possible in light of the above teachings. It is therefore to be understood that, within the scope of the appended claims, the invention may be practiced otherwise than as specifically described.

What is claimed is:

1. A method of fabricating a vacuum waveguide comprising the steps of:
   a. selecting an optionally flat substrate;
   b. depositing a film of metal on said substrate;
   c. photoetching a line corresponding to the width of said waveguide in said metal film;
   d. selecting a parylene pellicle;
   e. depositing a second metal film on one side of said pellicle;
   f. depositing a third film perpendicular to the length of the waveguide on the opposite side of said pellicle;
   g. stretching said pellicle over said substrate to form a channel; and
   h. evacuating said channel to complete said vacuum waveguide.

2. The method of claim 1 wherein said optically flat substrate reflects energy in the x-ray region.

3. The method of claim 1 wherein said first, second and third films are gold.

* * * * *